Aug. 28, 1928.
J. SWAN
1,682,638
LEFT HAND TURN LIGHT
Filed May 31, 1927   2 Sheets-Sheet 1
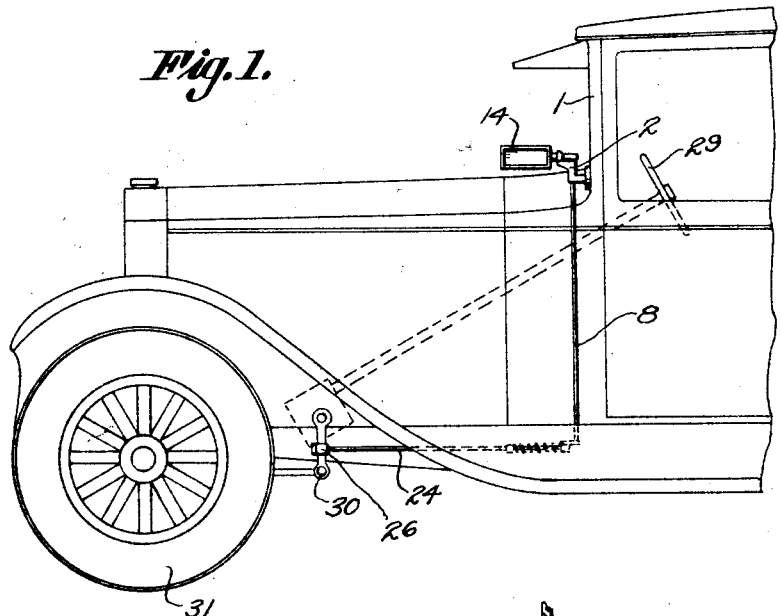
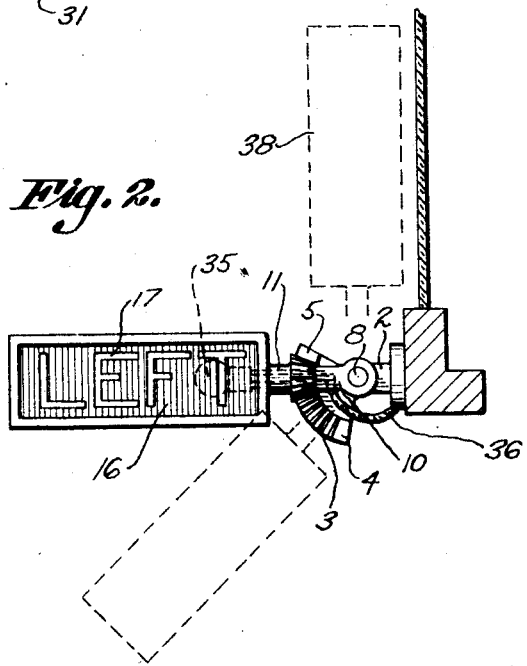
Judge Swan, Inventor
By C. A. Snow & Co.
Attorneys

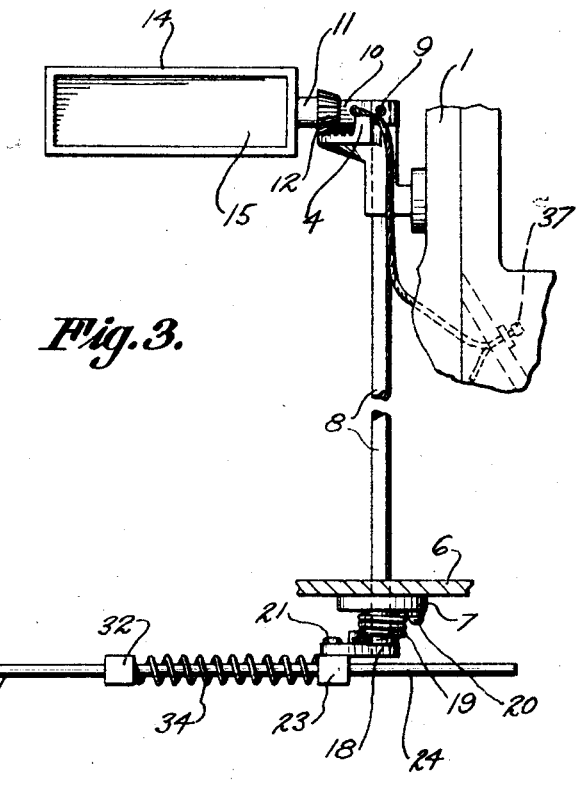

Patented Aug. 28, 1928.

1,682,638

UNITED STATES PATENT OFFICE.

JUDGE SWAN, OF DETROIT, MICHIGAN.

LEFT-HAND-TURN LIGHT.

Application filed May 31, 1927. Serial No. 195,353.

This invention aims to provide a simple means whereby, when the steering wheel of an automobile is operated to make a left turn, a signal will be actuated, to indicate to pedestrians and to the drivers of other vehicles, that the left turn is about to be made.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing form the spirit of the invention.

In the drawings:—

Figure 1 shows in side elevation, a portion of an automobile whereunto the device forming the subject matter of this application has been connected;

Figure 2 is a fragmental horizontal section showing the signal and attendant parts;

Figure 3 is a sectional vertical detail, wherein most parts appear in elevation;

Figure 4 is a horizontal section disclosing a portion of the actuating mechanism for the signal;

Figure 5 is a sectional view showing the mounting for the signal.

The numeral 1 designates any convenient portion of a vehicle, such as a pair of the cab, whereon is mounted a forwardly extended bracket 2. The bracket 2 has a segment 3 and there are stops 4 and 5 at the ends of the segment 3. On any accessible lower part of the body of the vehicle, as bearing 7 is mounted, as shown in Figure 3. In the bearing 7 and in the bracket 2, a substantially vertical shaft 8 is mounted for rocking movement.

By means of a securing element 9, a hollow arm 10 is held on the upper end of the shaft 8, the arm 10 being disposed in a substantially horizontal position, as shown in the drawings. A hollow shaft 11 is held for rotation on the arm 10 and is provided with a pinion 12 which meshes with the segment or rack 3. A signal 14, in the form of a box, if desired, is secured to the forward end of the shaft 11. The signal casing 14 is provided on one side with a transparent pane 15, and upon an adjacent side with a pane 16, which may carry the word "Left" as shown at 17. The pane 16 may be red, if desired, the panes 16 and 15 being disposed at right angles to each other.

An arm 18 is secured to the lower end of the shaft 8, at a point below the bearing 7. A torsion spring 19 is located about the lower end of the shaft 8, one end of the torsion spring 19 being secured, as shown at 20, to the bearing 7, and the opposite end of the spring engaging a stud 21 which is carried by the arm 18. The torsion spring 19 aids in swinging the signal box 17 from the dash line position of Figure 2 to the solid line position of that figure.

The arm 18 is pivoted at 22 to a rider 23 in which a connecting rod 24 is mounted for longitudinal reciprocation, the forward end of the rod 24 being pivoted at 25 to a clamp 26 or the like, the clamp being secured on the radius arm 27 which forms part of the steering gear 28 of the vehicle, the steering gear including the usual hand wheel 29 located in the cab. The radius arm 27 is connected as indicated at 30, with the movable front wheels 31 whereby the steering is brought about. The connecting rod 24 passes through an anchor block 32, held, adjustably, by a securing element 33, on the rod 24. A helical spring 34 surrounds a portion of the rod 24, one end of the spring being secured to the rider 23, and the other end of the spring being secured to the anchor block 32.

When the vehicle is running on a straight course, the signal 14 extends forwardly, in a direction parallel to the line of travel of the vehicle, as shown in Figures 2 and 3, and the transparent pane 15 is disposed vertically and at the side of the vehicle, the pane 16, carrying the word "Left" being disposed uppermost, as shown in Figue 2. The panes 17 and 16 may be illuminated at the will of an operator, by means of an electric lamp 35, located within the signal casing 14, the conductors 36 for the lamp 35 extending backwardly through and out of the hollow shaft 11 and the hollow arm 10. In the lighting circuit of the lamp 35 may be interposed a switch 37, placed at any desired position on the vehicle, the switch 37 constituting means whereby the lamp 35 may be lighted or extinguished at the will of an operator.

When the steering mechanism 28 is operated by the hand wheel 29 to turn the vehicle to the left, the arm 27 of the steering mechanism operates the rod 24, and by means of the spring 34, motion is transmitted to the arm 18 on the shaft 8, and the shaft is rotated. When the shaft 8 is rotated, the hollow arm 10 swings the signal casing 14, from the solid line position of Figure 2 to the dash line position of that figure, and when the signal is swung outwardly as aforesaid, rotation is imparted to the hollow shaft 11 and to the signal casing 14 on the shaft, because the pinion 12 on the shaft 11 meshes with the fixed rack or segment 3 on the bracket 2. When the signal casing 14 is turned on its axis as aforesaid, the pane 16 that carries the word "Left" at 17 is brought into a vertical and visible position at the side of the vehicle. When the steering mechanism is turned and operated, to put the vehicle on a straight course again, the parts are restored to the position of Figures 2 and 3, the pane 16 being uppermost, and the transparent pane 15 being shown at the side of the vehicle. When the signal swings outwardly from the solid line position of Figure 2 to the dash line position of that figure, the pinion 12 comes into contact with the stop 4. When the signal 14 is restored to the position of Figure 2, with the pane 16 uppermost, the pinion 12 comes into engagement with the inner stop 5. The result is that when the signal 14 is disposed parallel to the line of advance of the vehicle, the transparent pane 15, alone, is visible from the side of the vehicle, whereas when the signal 14 is swung outwardly to the dash line of Figure 2, the pane 16 will be exposed at the side of the vehicle; and in either instance, there will be no confusion caused by exposing parts of the panes 16 and 15 at once, at the side of the vehicle. Although the swinging movement of the signal 14 is limited, the steering of the vehicle is in nowise impeded, because the rod 24 can slide through the rider 23 on the arm 18, the spring 34 forming the operative connection between the rod 24 and the arm 18, and the spring 34 yielding, after the pinion 12 has come into contact either with the stop 5 or with the stop 4.

Some persons may desire at times to use the signal 14 to illuminate the road ahead, rather than as a left hand turn signal, and there is no reason why this cannot be done. Under such cicumstances, the securing element 9 is loosened, and the arm 10 is swung around on the shaft 8, the signal casing 14 then being placed at right angles to the line of advance of the vehicle, as shown in dash line at 38 in Figure 2 of the drawings. If the driver of the vehicle does not wish the signal 14 to operate, the set screw 33 in the anchor block 32 may be released, and, then, the rod 24 will slide through the block 32 and through the rider 23, without swinging the arm 18 and rotating the shaft 8.

What is claimed is:—

1. In a device of the class described, a substantially vertical shaft, means for operating the shaft, means for supporting the shaft for rotation on a vehicle, an arm on the shaft, a signal journaled on the arm and comprising an illuminating pane and a signal pane disposed at an angle to each other, a pinion secured to the signal, a fixed rack wherewith the pinion meshes, the rack having inner and outer stops, the pinion engaging the inner stop to dispose the signal parallel to the line of advance of the vehicle with the illuminating pane in a substantially vertical position and exposed at the outer side of the signal, the pinion engaging the outer stop to dispose the signal at an angle to the line of advance of the vehicle with the signal pane in a substantially vertical position and exposed to view, means for connecting the arm releasably to the shaft whereby the arm may be disconnected from the shaft and swung inwardly on the shaft across the vehicle with the illuminating pane at the front of the signal and transverse to the line of advance of the vehicle, thereby to light the road ahead.

2. In a device of the class described, a shaft, means for supporting the shaft for rotation on a vehicle, a first arm on the shaft, a signal journaled on the first arm and disposed approximately at right angles to the shaft, a pinion secured to the signal, a fixed rack wherewith the pinion engages, a second arm on the shaft, a rider pivoted to the second arm, a rod slidable in the rider, an anchor on the rod, a retractile spring about the rod, one end of the spring being connected to the rider, and the other end of the spring being connected to the anchor, means for connecting the rod with a movable part of the steering mechanism of a vehicle, and means for connecting the anchor releasably with the rod, whereby the rod, at the will of an operator, may be permitted to slide through the anchor and the rider without actuating the signal when the steering mechanism is operated.

In testimony that I claim the foregoing as my own, I have hereto affixed my signature.

JUDGE SWAN.